(12) United States Patent
Hinkle et al.

(10) Patent No.: US 8,458,675 B1
(45) Date of Patent: Jun. 4, 2013

(54) SYSTEM AND METHOD FOR DYNAMIC SYMBOLIC MATH ENGINE SELECTION

(75) Inventors: Benjamin Hinkle, Watertown, MA (US); Pieter Mosterman, Framingham, MA (US); Mary Ann Branch Freeman, Holliston, MA (US); Roy E. Lurie, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 1356 days.

(21) Appl. No.: 12/143,363

(22) Filed: Jun. 20, 2008

Related U.S. Application Data

(60) Provisional application No. 60/986,830, filed on Nov. 9, 2007.

(51) Int. Cl.
*G06F 9/44* (2006.01)

(52) U.S. Cl.
USPC .......................................................... 717/139

(58) Field of Classification Search
None
See application file for complete search history.

(56) References Cited

U.S. PATENT DOCUMENTS

| | | | | |
|---|---|---|---|---|
| 5,469,538 A | * | 11/1995 | Razdow | 345/440 |
| 5,526,475 A | * | 6/1996 | Razdow | 715/205 |
| 2007/0255782 A1 | * | 11/2007 | Tannenbaum et al. | 709/201 |
| 2009/0019099 A1 | * | 1/2009 | Kunz et al. | 708/200 |

* cited by examiner

*Primary Examiner* — Philip Wang
(74) *Attorney, Agent, or Firm* — Venable LLP; Michael A. Sartori; Christopher B. Tokarczyk

(57) ABSTRACT

In an embodiment, a computer-readable medium may include computer-executable instructions for selecting a symbolic math engine. The instructions may be executed on a processor. The medium may include: one or more instructions for dynamically selecting a first symbolic math engine from two or more symbolic math engines; one or more instructions for converting a symbolic command from a standard format into a first format compatible with the first symbolic math engine; one or more instructions for passing the converted command to the first symbolic math engine for executing, the executing including producing a result; and one or more instructions for outputting or storing the result of the executing.

23 Claims, 9 Drawing Sheets

SYSTEM AND METHOD FOR DYNAMIC SYMBOLIC MATH ENGINE SELECTION

This application claims priority to U.S. Provisional Patent Application No. 60/986,830 to Hinkle et al., filed Nov. 9, 2007 entitled "System and Method for Dynamic Symbolic Math Engine Selection," the subject matter of which is being incorporated herein by reference in its entirety.

BACKGROUND

Mathematical and computational software applications may allow users to manipulate expressions and algorithms symbolically, including performing symbolic math operations. Symbolic math operations may include, for example, calculus operations, linear algebra operations, solutions of equations, expression simplification, expression evaluation, differentiation, integration, root-finding, etc.

Mathematical and computational software applications may conventionally supply at least one library of software programs, called a symbolic math engine, to perform symbolic math operations.

A symbolic math engine may have a specific language and/or syntax used to send commands to the symbolic math engine. This unique language and/or syntax may mean that switching from one symbolic math engine to another symbolic math engine to solve the same expression may require rewriting one or more lines of code. For example, solving the equation $x^2=2$ for the value of variable x via a first symbolic math engine may require the syntax "allvalues(solve ({x^2=2},x))." Solving the same equation via a second symbolic math engine may require the syntax "solve([x^2=2],[x], PrincipalValue)." Further, first and second symbolic math engines may return their respective solutions in different formats or data types, which may require correctly anticipating the return format or data type. For example, one symbolic math engine may return a list of floating point numbers, while another symbolic math engine may return an array of floating point numbers.

BRIEF DESCRIPTION OF THE DRAWINGS

The accompanying drawings, which are incorporated in and constitute a part of this specification, illustrate one or more embodiments of the invention and, together with the description, explain the invention. In the accompanying drawings.

DETAILED DESCRIPTION

Example embodiments of the invention are discussed below. While specific example embodiments are discussed, it should be understood that this is done for illustration purposes only.

In an embodiment, a system and method may be provided to allow a user of a mathematical and computational software application to change among several symbolic math engines dynamically by using a single common interface. Changing symbolic math engines dynamically may refer to changing among symbolic math engines while a model or program is executing in a technical computing environment. Changing dynamically may also include changing symbolic math engines while a single command is executing, and changing without having to exit and restart the technical computing environment In one example, a system may provide a single command that allows the user to change a symbolic math engine while the symbolic math engine is available for use by the technical computing environment, and running (e.g., operating on an expression). The system may also include an engine controller that may convert the syntax of the user's command into a form used by a currently available symbolic math engine. Converting the syntax of a user's command may include converting the user's command into a syntax compatible with the currently available symbolic math engine.

Figure 1:
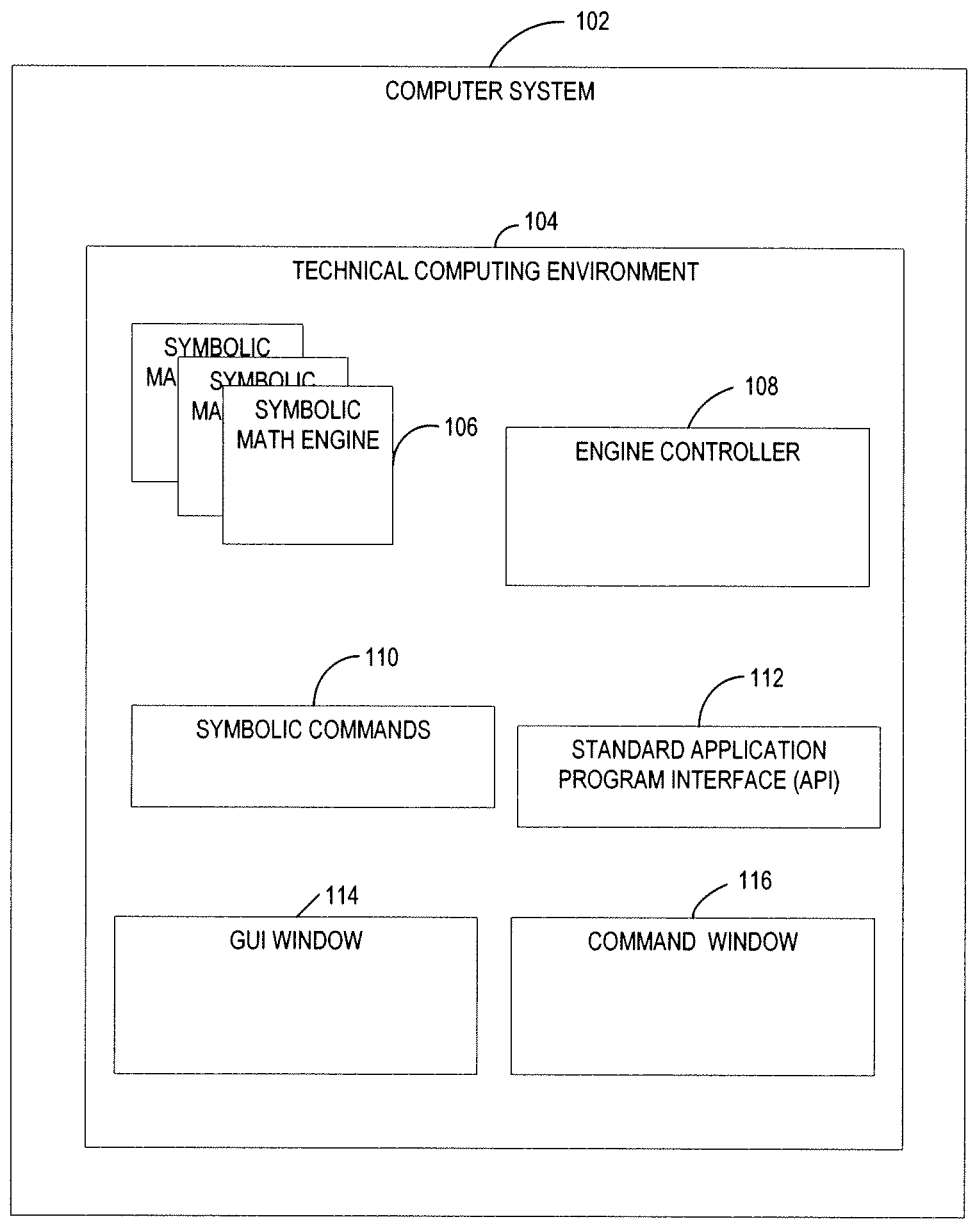
FIG. 1 depicts an embodiment of a technical computing environment (TCE) that may be used to implement a mathematical and computational software application.

FIG. 1 depicts an example of a technical computing environment (TCE) 104, operating on a computer system 102. TCE 104 may be configured to provide a mathematical and computational software application, and may include, for example, one or more symbolic math engines 106, an engine controller 108, symbolic commands 110, and a standard application program interface (API) 112. TCE 104 may also provide a graphical user interface (GUI) window 114 and/or a command window 116 to allow the user to create and solve symbolic math operations. TCE 104 may be, for example, a graphical programming environment, an ordinary differential equations/differential algebraic equations (ODE/DAE) environment, a physics modeling environment, a graphical modeling environment, etc.

Symbolic math engines 106 may perform symbolic math operations. Certain symbolic math engines 106 may be provided with TCE 104, while other symbolic math engines 106 may be provided in other ways, for example, by third parties, for use with TCE 104. A symbolic math engine 106 may have a language and syntax used to send commands to the symbolic math engine.

Embodiments of symbolic math engines 106 may interact with TCE 104 in a number of ways, such as via a registration process, a discovery process, etc. In one registration process, TCE 104 may publish information that allows a symbolic math engine 106 to make itself known to TCE 104. For example, a registry entry in a WINDOWS® system, a shell environment variable in UNIX, etc., may point to a symbolic math engine 106. Alternatively, TCE 104 may look for symbolic math engines 106 in a particular location in a file system. In one discovery process, TCE 104 may know or inquire which symbolic math engine is already available.

A symbolic math engine 106 may run in the same process as TCE 104, or in a separate process, or in multiple processes. A symbolic math engine 106 may run on the same computer system 102 as TCE 104, or on a separate computer system, or on multiple computer systems. Symbolic math engine 106 is discussed further below with respect to FIG. 2.

Engine controller 108 may allow, for example, the user, to change or switch among the symbolic math engines 106 dynamically while the model or program using the symbolic math engine 106 is available or operating on an expression.

Engine controller 108 may convert a symbolic command 110 into the particular syntax and command of an available symbolic math engine 106. Alternatively, engine controller 108 may convert a symbolic command 110 directly into an in-memory representation of a symbolic engine-specific command. Engine controller 108 may convert a result from a symbolic math engine 106 back into a syntax or format compatible with the symbolic command 110. Engine controller 108 is discussed further below with respect to FIG. 3.

TCE 104 may provide a set of symbolic commands 110 in a standard format. Symbolic commands 110 may be provided in a specific programming language. In an embodiment, symbolic commands 110 may be implemented in, and have the syntax of, a different programming language from one or more of the symbolic math engines 106. For example, the symbolic commands 110 may be in an array-based language such as, for example, MATLAB, where an array is a basic element and may not require dimensioning. One or more other symbolic math engines 106 may receive commands written in a non-array based language, such as, for example, Statecharts, Activity Diagrams, UML, SimMechanics, SysML, etc. Other symbolic math engines 106 may receive commands written in languages that work with arrays, such as, for example, FORTRAN 90, GNU OCTAVE, Python, C, C++, Java, Javascript, Flash, VHDL, Verilog, Modelica, etc.

The symbolic commands 110 may be used to solve or evaluate symbolic math expressions in TCE 104, regardless of which symbolic math engine 106 is available to TCE 104. For example, in an embodiment, the user may invoke the commands supported by a variety of symbolic math engines 106 via a single standard format provided by symbolic commands 110.

Standard API 112 may provide a single, consistent interface for interacting with TCE 104. Standard API 112 may include symbolic commands 110. Engine controller 108 may use standard API 112 in converting symbolic commands 110 into engine-specific commands, as will be described further below.

Figure 2:
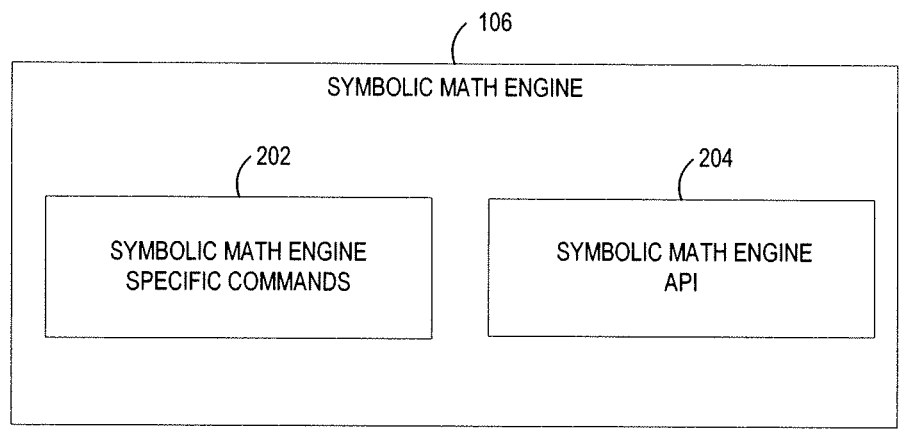
FIG. 2 depicts a block diagram representing an example of a symbolic math engine.

FIG. 2 depicts a block diagram of an example of a symbolic math engine 106. A symbolic math engine 106 may include a set of symbolic math engine-specific commands 202 and a symbolic math engine-specific application program interface (API) 204.

Symbolic math engine-specific commands 202 may include statements that, when executed, cause the symbolic math engine to perform an operation. The symbolic math engine-specific commands 202 may be in a specific programming language and have a specific syntax expected by the symbolic math engine 106 in order to perform the operation.

Symbolic math engine-specific API 204 may provide an interface to the set of symbolic math engine-specific commands 202. Engine controller 108 may use symbolic math engine-specific API 204 to convert a standard symbolic command 110 to a symbolic math engine-specific command 202.

In an embodiment, a symbolic math engine 106 may store equations and/or expressions, for example, as the result of a previous computation. The stored equations and/or expression may be passed as parameters, for example, to other equations or expressions, engine controller 108, etc. References or pointers to the stored equations or expressions may also be passed as parameters.

A symbolic math engine 106 may have several different possible configurations. A configuration may include settings specifying, for example, a particular solving method, search algorithm, optimization, tolerance, tearing variable, etc. The different configurations may require different command syntaxes from each other. In an embodiment, dynamically switching from one symbolic math engine to another may include switching the same symbolic math engine from one configuration to another.

Figure 3:
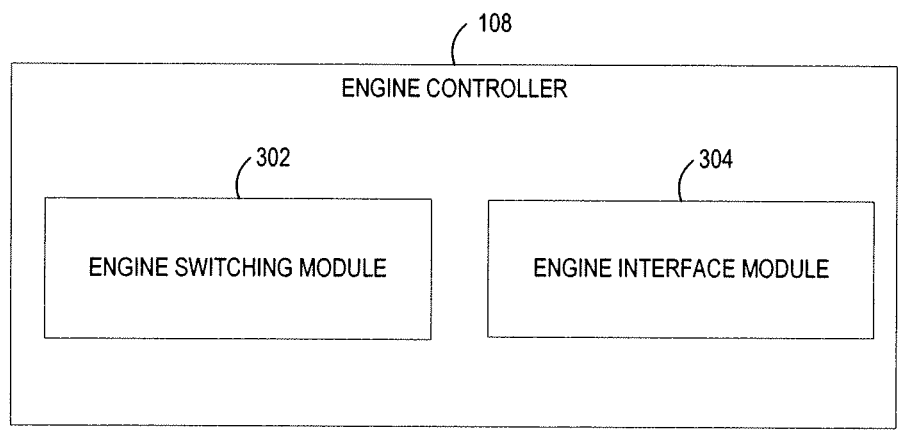
FIG. 3 depicts a block diagram representing an example of an engine controller.

FIG. 3 depicts a block diagram of an example of engine controller 108. Engine controller 108 may include an engine switching module 302 and an engine interface module 304.

Engine switching module 302 may change or switch among the symbolic math engines 106 dynamically while the model or program using the symbolic math engine 106 is running. Engine switching module 302 may receive a request to change from one available symbolic math engine 106 to a different symbolic math engine 106. The request may be received manually, for example, from the user, or automatically, for example, from TCE 104. Engine switching module 302 may then locate, or load and run, the requested symbolic math engine 106.

Engine interface module 304 may receive a symbolic command 110 and convert the symbolic command 110 into the particular command that is syntactically correct and understandable by an available symbolic math engine 106. Engine interface module 304 may convert a result received from a symbolic math engine 106 into a syntax or format compatible with the symbolic command 110. For example, engine controller 108 may convert the symbolic command 110 to a symbolic math engine-specific command 204 via standard API 112 and/or symbolic math engine-specific API 204.

Engine controller 108 may receive references or pointers to the stored equations or expressions as parameters. Arrays or lists of references to equations or expressions may also be passed to engine controller 108. For example, instead of passing a string describing an equation, e.g. "x^2=4," or multiple strings, e.g. "x^2=4," "y^2=9," to engine controller 108, references or pointers to the string(s) may be obtained and passed in one array containing the references or pointers. Similarly, references to computed answers may be returned as the result of a computation, instead of the actual answer.

Figure 4:
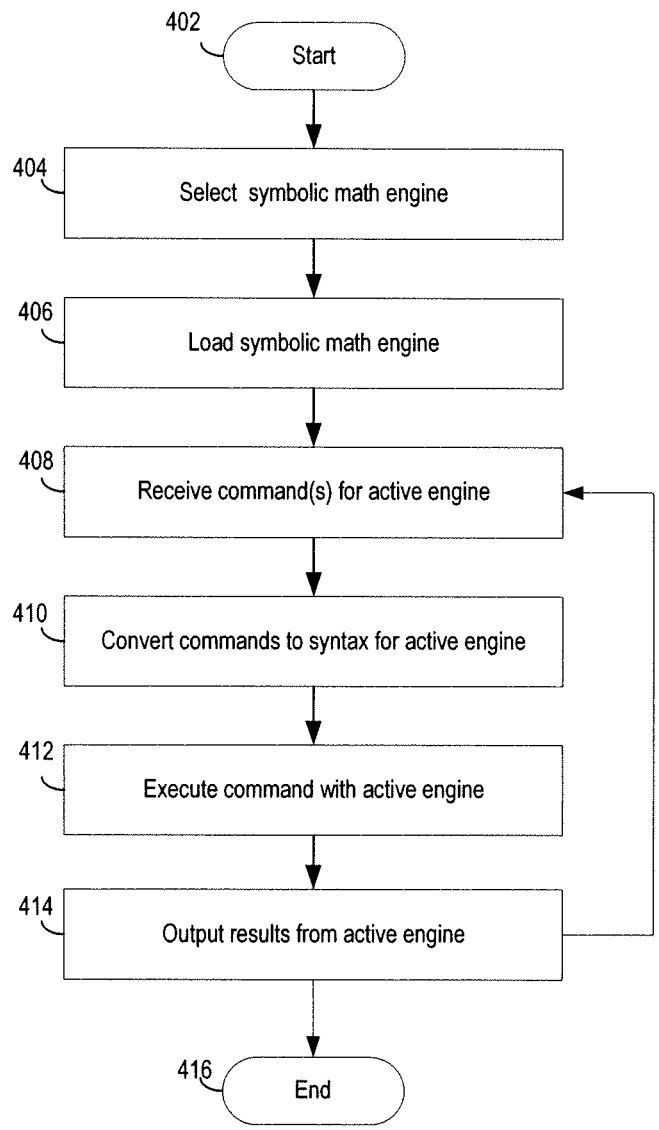
FIG. 4 depicts a flowchart of a sequence of acts that may be used to switch dynamically among symbolic math engines and to use symbolic math engines according to an embodiment.

FIG. 4 depicts a flowchart of a sequence of acts that may be used to switch dynamically among dynamic symbolic math engines 106. The sequence may begin at block 402 and end at block 416. In block 404, a symbolic math engine 106 may be selected. Embodiments may select symbolic math engines 106 manually (e.g., via user input) or automatically (e.g., via TCE 104). For a manual selection, the user may, for example, type a command that selects a symbolic math engine 106. An example of a select command may be, for example, "symengine('engine2')", where 'symengine( )' is the command, and 'engine2' is the name of the selected symbolic math engine 106. The user may select a symbolic math engine 106 from a graphical user interface component, for example, a component of GUI window 114, such as a menu. The user may also select a symbolic math engine 106, for example, using a web service, over a network, etc. Alternatively, TCE 104 may automatically select a symbolic math engine 106 based on various criteria, including, for example, what type of operation the user wishes to execute, memory availability, execution speed, user-specified criteria, etc. TCE 104 may select a symbolic math engine 106 in a similar manner to that described above for manually selecting.

In block 406, the selected symbolic math engine may optionally be loaded to make it available to TCE 104. Loading the selected symbolic math engine may include making the symbolic math engine ready to receive commands from, for example, TCE 104. Loading may include, for example, loading a symbolic math engine into memory. If the selected symbolic math engine 106 is not already available, it may be located, and initialized if necessary. Initializing a symbolic math engine 106 may include, for example, reserving space in memory for variables, setting initial values for variables, etc.

In an embodiment, selecting and loading a symbolic math engine 106 may be performed with a single command. For example, if a symbolic math engine 106 is already ready for use by TCE 104, then the available symbolic math engine 106 may be "loaded" in block 406 by setting the selected symbolic math engine 106 as the available symbolic math engine. In another example, a symbolic math engine 106 may be available over a network or via a web service, where the command may be in a URL format. "Loading" a symbolic math engine 106 located on a network may include establishing a connection to the symbolic math engine 106 over the network. In an embodiment, a symbolic math engine 106 may be accessed via simple object access protocol (SOAP). In an embodiment, more than one symbolic math engine 106 may be available at the same time.

In block 408, TCE 104 may receive one or more symbolic commands 110 for execution by an available symbolic math engine 106. TCE 104 may receive the symbolic commands 110 from, for example, the user, via, for example, the command window 116, the GUI window 114, a file, another device, etc.

In block 410, engine controller 108 may convert the received symbolic commands 110 to the language and/or syntax compatible with one or more available symbolic math engines 106, for example, via engine interface module 304. If more than one symbolic math engine 106 is available simultaneously, engine controller 108 may convert the symbolic commands 110 in parallel for the available symbolic math engines 106. In an embodiment supporting multiple simultaneously available symbolic math engines 106, symbolic commands 110 may be sent in parallel to the available symbolic math engines 106, regardless of the type of symbolic math engine, assumptions of the symbolic math engines, or parameters of the symbolic math engines.

In an embodiment where TCE 104 automatically selects which symbolic math engine to make available, TCE 104 may select a symbolic math engine 106 after a symbolic command 110 is received, rather than before.

Engine controller 108 may convert a received symbolic command 110 directly into a in-memory representation of the symbolic command for use by the symbolic math engine 106. An in-memory representation of a symbolic math engine-specific command may be the result of a symbolic math engine 106 parsing the command into memory. An in-memory representation may be a structured representation of the command and the parameters of the command. In one example, the in-memory representation may be a tree structure. The root of the tree may be the command, and the child nodes of the tree may be the arguments or parameters of the command. An in-memory representation of the command "solve(x^2=2,x)" may be a tree with 'solve' as the root node, and two child nodes. The first child node may be an equation node with two children x^2 and 2. The second child node may be the symbol 'x'.

In an embodiment supporting multiple symbolic math engines available at the same time, a symbolic math engine having one configuration may run in parallel with the same symbolic math engine having a different configuration.

In block 412, the available symbolic math engine 106 may execute the converted command (or an in-memory representation) and provide the result to engine controller 108, for example, via engine interface module 404. In an embodiment, engine controller 108 may convert the result, if desired, into the standard format of TCE 104. For example, the engine controller 108 may convert a vector or matrix format to a list format. Other formats may include, for example, matrices, arrays, sets, lists, etc. Additionally, engine controller 108 may transform between a numeric format, for example, floating point values, and an exact symbolic representation, for example, between 0.5 and "½", or between 3.14 and "π", etc.

In block 414, TCE 104 may output the result including, for example, displaying the result on a display, printing the result, storing the result, transmitting the result to another computer, etc. In one embodiment, multiple symbolic math engines 106 may be running in parallel, and results from the symbolic math engines 106 may be output in parallel or in series.

After results are output in block 414, additional symbolic commands 110 for the same available symbolic math engine (s) may be input, starting again in block 408. Alternatively, a different symbolic math engine 106 may be selected and loaded, starting again in block 404. In an embodiment that uses a single available symbolic math engine 106, loading a new symbolic math engine in block 406 may replace the available symbolic math engine. In this embodiment, resources used by the available symbolic math engine may be reallocated to the new available symbolic math engine. In contrast, an embodiment that runs multiple symbolic math engines 106 in parallel may load a new symbolic math engine 106 in block 406 without affecting other symbolic math engines currently available.

Figure 5:
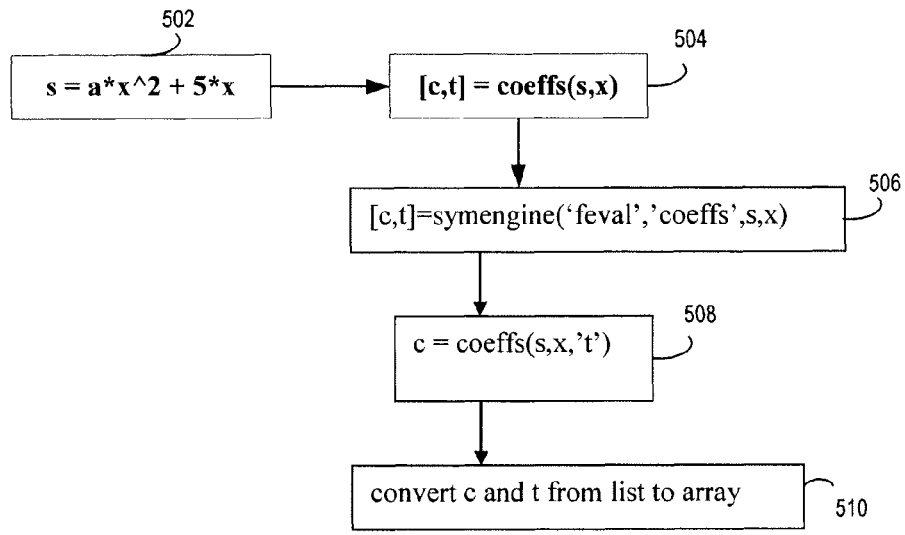
FIG. 5 depicts an example of a series of commands that may be used with the sequence illustrated in FIG. 4.

FIG. 5 illustrates an example of a sequence that transforms a symbolic command 504 into a symbolic math engine-specific command 508. The sequence may relate to the process performed in blocks 408-414 in FIG. 4. Referring to FIG. 5, in TCE 104, symbolic command 504, i.e. "coeffs(s,x)," may find coefficients of a symbolic expression 502, i.e. "s," having a symbolic variable "x". When evaluated, the outputs of symbolic command 504 may be "c," containing the coefficients of "s", and "t," containing the terms of s with respect to x. For example, for the symbolic expression 502, the coefficients c may be a two-element array [a, 5], and the terms t may be a two-element array [x^2, x].

Referring now to FIG. 5, engine controller 108 may use the "symengine" command in block 506 to transform the symbolic command in block 504 into a symbolic math engine-specific command shown in block 508. The available symbolic math engine may evaluate symbolic math engine-specific command 508 and may return the coefficients in a list "c," and may return the terms in a list stored in the named variable passed in as the third argument (i.e. "t").

In block 510, TCE 104 may convert the list "c" returned by symbolic engine specific command 508 from a list to an array to make the returned list compatible with symbolic command 504.

In another embodiment, engine controller 108 may transform either symbolic command 504, or the command in block 506, directly into an in-memory representation of the symbolic math engine-specific command shown in block 508.

Figure 6:
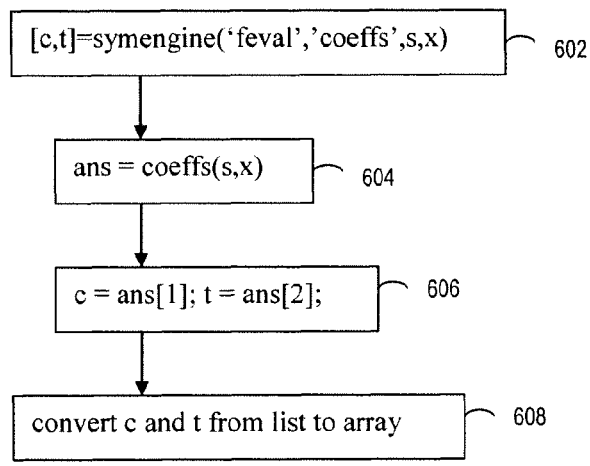
FIG. 6 depicts an example of a series of commands that may be used with the sequence illustrated in FIG. 4.

FIG. 6 illustrates an example of a sequence that transforms symbolic command 504 from FIG. 5 into a command specific to a different symbolic math engine from the one in FIG. 5. In block 602, engine controller 108 may use the "symengine" command to transform symbolic command 504 for a different available symbolic math engine 106. In this example, the symbolic math engine-specific command may be as shown in block 604. The symbolic math engine-specific command shown in block 604 may have the form "ans=coeffs(s,x)," where "ans" may be a list of two lists: the list of coefficients, i.e. "c", and the list of terms, i.e. "t".

In block 606, engine controller 108 may resolve the list stored in "ans" into two lists, one for coefficients "c" and one for terms "t."

In block 608, engine controller 108 may convert the lists in c and t into an array to make the returned lists compatible with symbolic command 504, which may return an array.

Figure 7:
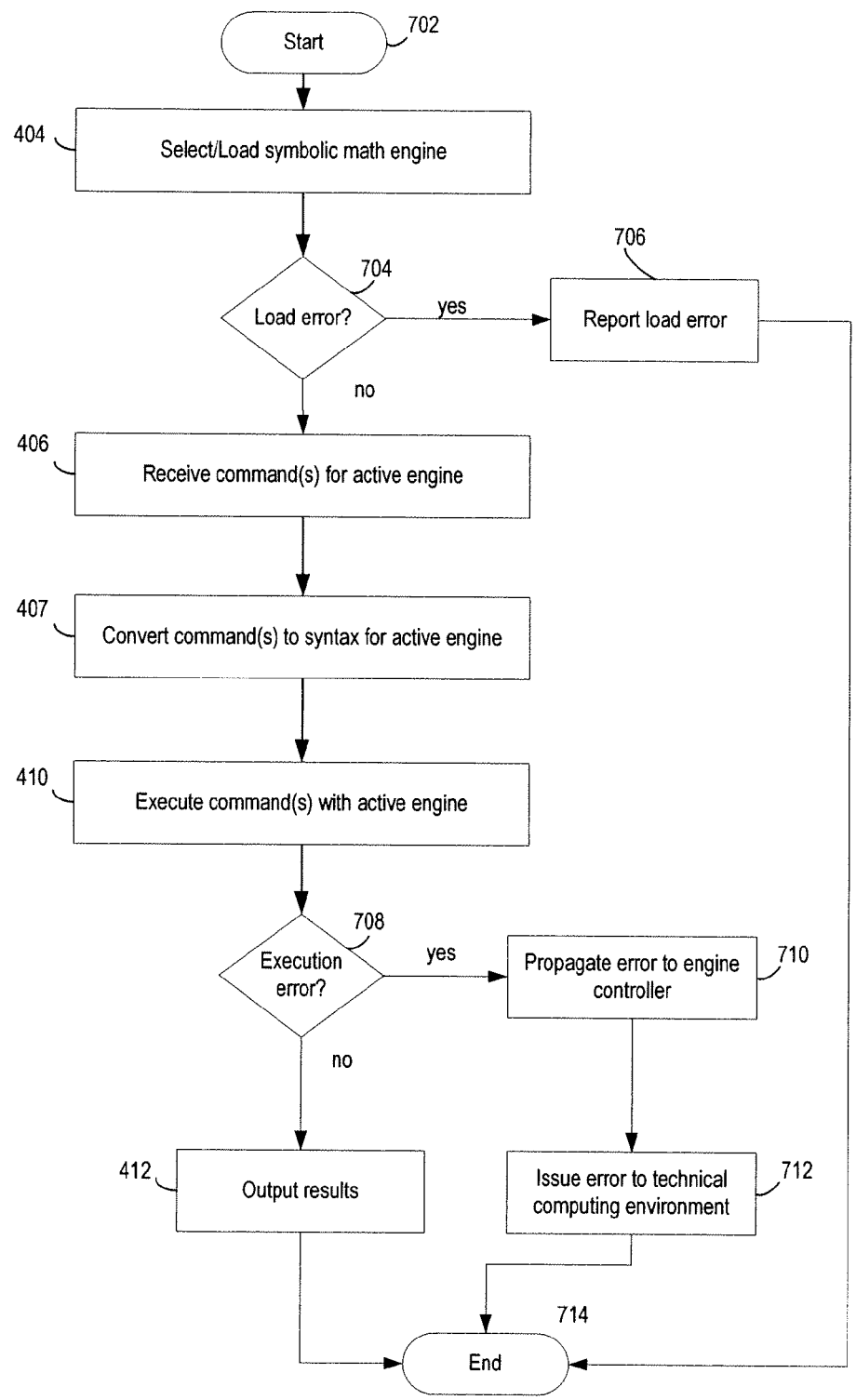
FIG. 7 depicts a flowchart of a sequence of acts that may be used to handle errors when switching and using symbolic math engines dynamically according to an embodiment.

FIG. 7 illustrates a flowchart of a sequence of acts that may be used to handle errors when dynamically switching and using symbolic math engines, according to an embodiment. Errors may refer to, for example, exceptions, unexpected results, logic errors, communication errors, etc.

The sequence illustrated in FIG. 7 may be related to the sequence illustrated in FIG. 4. Turning to FIG. 7, if an error occurs at block 704, during selecting and/or loading (block 404), a load error may be reported by the engine controller 108 in block 706. Load errors may occur because of, for example, failure to locate the engine to be loaded, failure to initialize the engine, etc.

After a successful load, errors may occur within the symbolic math engine 106. For example, an error may occur while a command is executed within the symbolic math engine 106 (block 410). If such an execution error occurs, in block 708, the execution error may be propagated back to the engine controller 108 in block 710.

Engine controller 108 may issue the error in TCE 104, in block 712. If the error in execution is a basic error that may occur in any symbolic math engine, the error may be recognized by the engine controller 108 and converted into an error from a standard predefined set of errors in TCE 104. The standard predefined set of errors may be a component of standard API 112, a component of symbolic commands 110, or compatible with symbolic commands 110. A basic error may be, for example, too many equations in a solve command, failing to find an anti-derivative for a function, etc. The sequence may end at block 714.

Other errors may occur in a symbolic engine 106. For example, a symbolic math engine 106 may fail to find a symbolic solution to a requested operation. In that case, engine controller 108 may attempt to find a numeric solution to the requested operation via the same symbolic math engine, or may select a different symbolic math engine.

Figure 8:
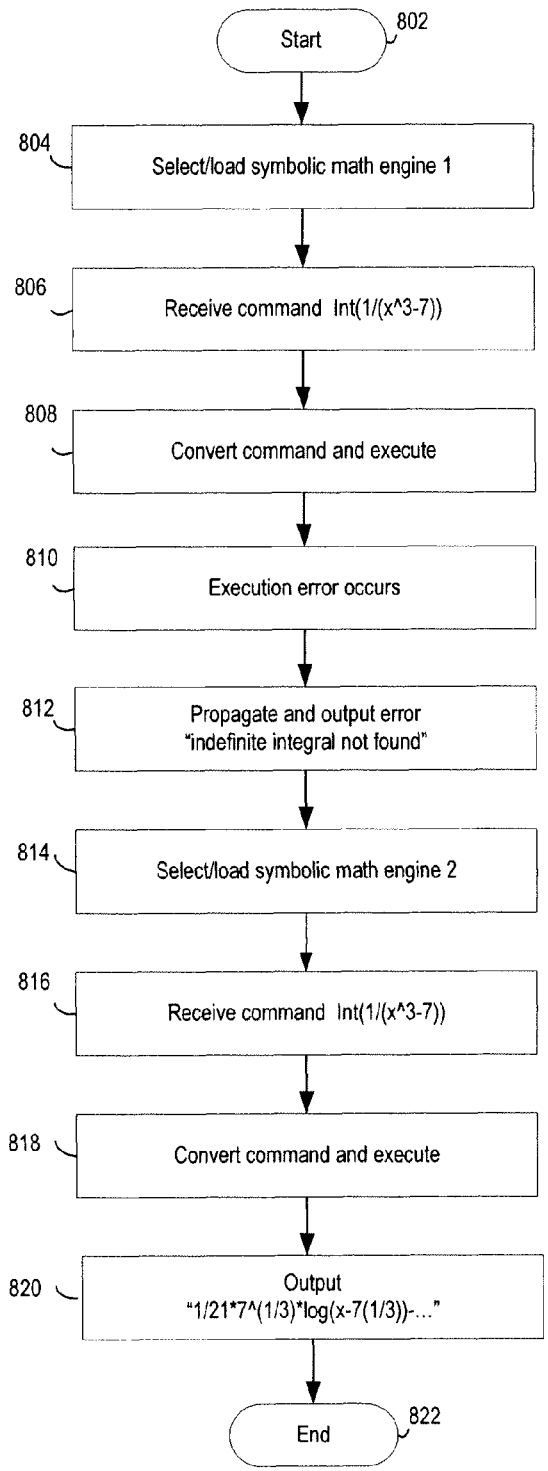
FIG. 8 depicts an example of a series of commands that may be used with the sequence illustrated in FIG. 7.

FIG. 8 depicts a sequence illustrating example of using an embodiment, starting at block 802. The sequence illustrated in FIG. 8 may be related to the sequences shown in FIGS. 4 and 7.

In block 804, a first symbolic math engine may be selected and loaded, for example, as in blocks 404 and 406.

In block 806, a symbolic command may be received, for example, from the user, as in block 408. In block 806, the symbolic command may refer to a symbolic integration function "int( )" The command in block 804, when solved, may compute the indefinite integral of the expression "$1/(x^3-7)$."

In block 808, engine controller 108 may convert the received symbolic command into the syntax and form compatible with the first symbolic math engine, as in block 410. The first symbolic math engine may attempt to compute the indefinite integral of the expression $1/(x^3-7)$, as in block 412.

In block 810, during the attempted computation in block 808, the first symbolic math engine may fail to compute the indefinite integral and may generate an error. The error may be a standard error within TCE 104, or may be converted into a standard error, for example, by engine controller 108. Instead of an error, the first symbolic math engine may return, for example, a null result, an empty list, a null string, etc. The error may be propagated to engine controller 108, as in block 710.

In block 812, engine controller 108 may propagate the error to TCE 104, which may output the error. Engine controller may convert a "null" result into an error, or may convert an error from the first symbolic math engine into a an error format and syntax compatible with TCE 104.

In block 814, a second symbolic math engine may be selected dynamically, while TCE 104 is still running, for example, as in blocks 404 and 406.

In block 816, the symbolic command previously received in block 806 may be received again for evaluation.

In block 818, engine controller 108 may convert the received symbolic command into the syntax and form compatible with the second symbolic math engine. The second symbolic math engine may successfully compute the indefinite integral of the expression $1/(x^3-7)$.

In block 820, the second symbolic math engine may output the result, as in block 414. The result may be displayed. The sequence may end at block 822.

Figure 9:
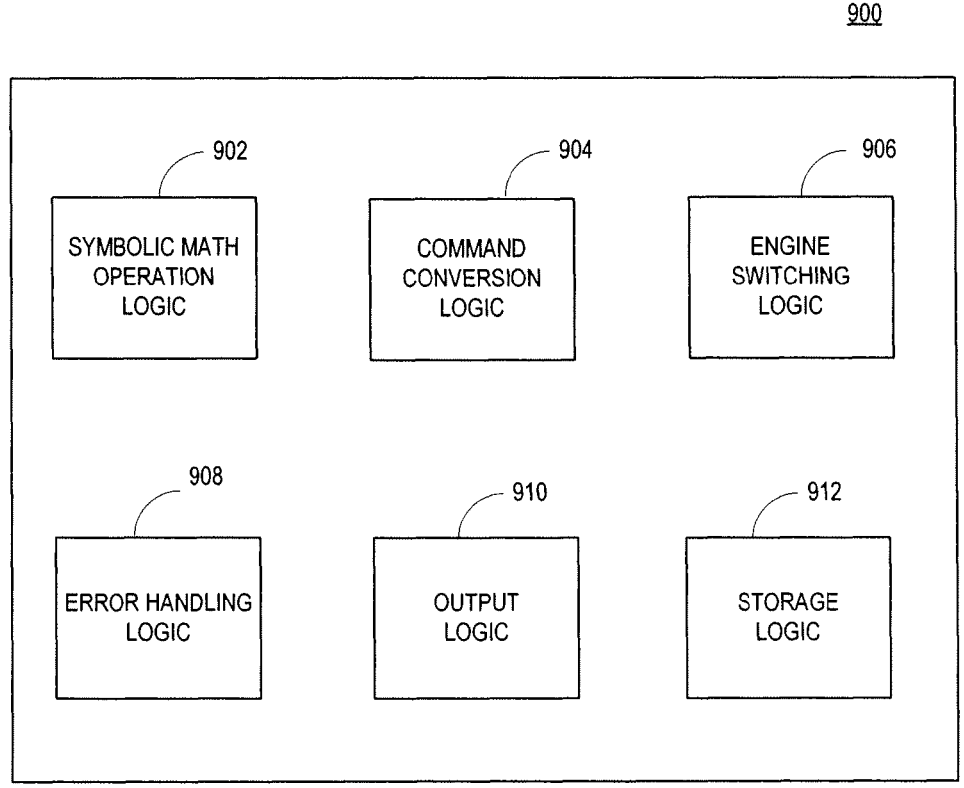
FIG. 9 depicts a block diagram describing logical elements that may be used to implement a technical computing environment (TCE)

FIG. 9 depicts a functional block diagram 900 describing logical elements that may be used to implement TCE 104. The logical elements may be implemented in hardware, software, or a combination thereof. Embodiments may include, for example, symbolic math operation logic 902, command conversion logic 904, engine switching logic 906, error handling logic 908, output logic 910, and storage logic 912. The logical elements may be implemented in hardware, software, or a combination thereof. The elements depicted in FIG. 9 are an example of the elements that may be used to implement TCE 104. Other TCEs may include other elements, fewer elements, more elements, etc.

Symbolic math operation logic 902 may perform the symbolic math operations for the symbolic math engines 106. The operations may include assembling, compiling, interpreting or otherwise creating and executing machine instructions to perform the symbolic math operations.

Command conversion logic 904 may convert a command from the symbolic commands 110 into the appropriate syntax and form for a specified symbolic math engine 106.

Engine switching logic 906 may locate and load a selected symbolic math engine 106, including allocating memory and other resources.

Error handling logic 908 may identify, catch, interpret or otherwise determine that an error has occurred during operation of TCE 104. Errors may include, for example, syntax errors, loading errors, errors in executing a symbolic math operation, errors generated by engine controller 108, errors generated by a symbolic math engine 106, etc. Error handling logic 908 may take appropriate action depending on the type of error and when the error occurred.

Output logic 910 may be configured to, for example, display, store, and/or transmit results of performing the symbolic math operations. Displaying may include text-based or graphics-based output, for example, to a display screen, printer, or other image-based output medium or device.

Storage logic 912 may be configured to store and/or organize code, commands, input data and output data defining and/or relating to the symbolic math engines 106, engine controller 108, and symbolic commands 110 for use by TCE 104.

Figure 10:
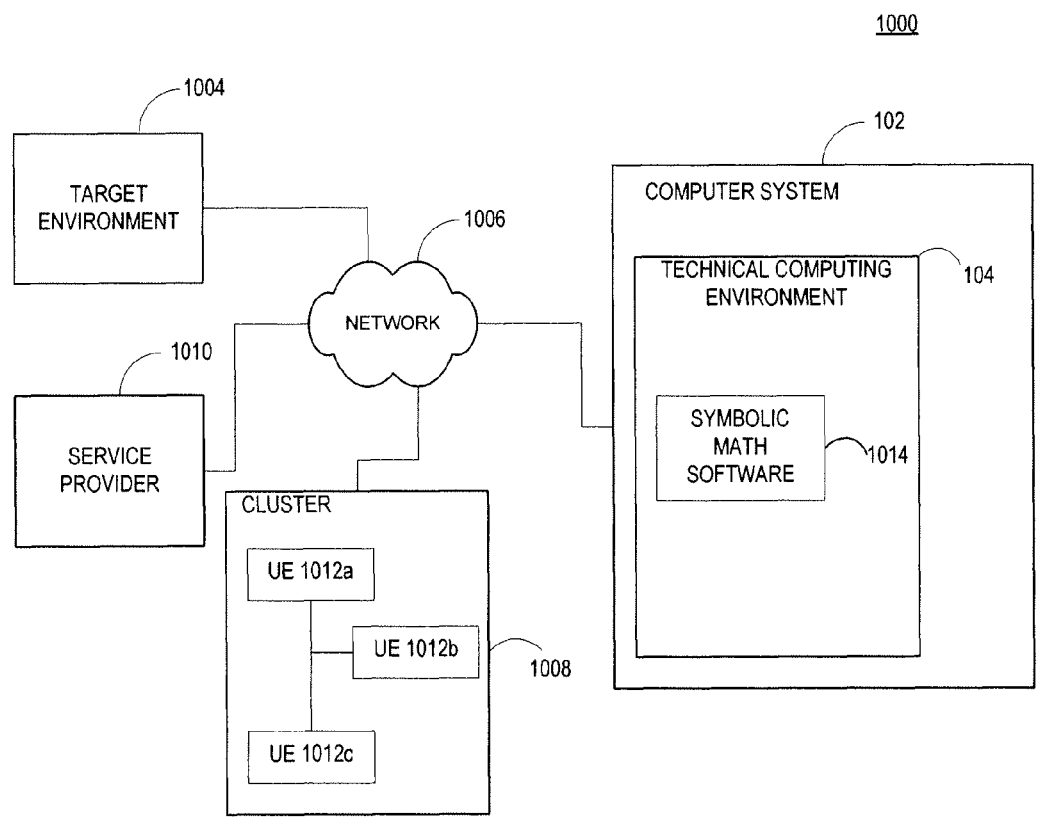
FIG. 10 depicts a computer network that may be used with example embodiments.

FIG. 10 depicts an example of an environment 1000 that may include a computer system 102, target environment 1004, network 1006, cluster 1008, and service provider 1010. Note that the distributed environment illustrated in FIG. 10 is just one example of an environment that may be used with the invention. Other environments that may be used with the invention may include environments that contain additional devices, fewer devices, or devices in arrangements that differ from the arrangement of environment 1000.

Computer system 102 may include a device capable of sending and/or receiving information (e.g., data) to and/or from another device, for example, target environment 1004. Information may refer to any type of machine-readable information having substantially any format that may be adapted for use, for example, in one or more networks and/or with one or more devices. The information may include digital information and/or analog information. The information may further be packetized and/or non-packetized.

In an embodiment, computer system 102 may include a technical computing environment (TCE) 104. TCE 104 may include an environment that may be used to solve or compute mathematical operations in accordance with techniques described herein. In other embodiments, computer system 102 may include other components, applications, etc. TCE 104 may contain computer-executable instructions (code) and data that are configured to implement TCE 104. The instructions may include instructions configured to implement symbolic math software 1014. The symbolic math software 1014 may be graphical, textual or a hybrid that includes both textual and graphical capabilities/features.

The symbolic math software 1014 may include computer-executable instructions that allow, for example, a user to execute or solve symbolic math operations. For example, the -symbolic math software 1014 may allow a user to enter symbolic math operations in a standardized format, and may convert the standardized commands into commands specific to an available symbolic math engine 106. Symbolic math software 1014 may also allow a user to switch among several symbolic math engines 106 dynamically within TCE 104. In an embodiment, the symbolic math software 1014 may be used by MATLAB® and/or SIMULINK® software, all of which are available from The MathWorks, Inc., Natick, Mass.

The network 1006 may include any network capable of exchanging information between entities associated with the network 1006, including, for example, the computer 1002, the service provider 1010, the target environment 1004 and the cluster 1008. The information may include, for example, packet data and/or non-packet data. Implementations of the network 1006 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, SOAP, remote method invocation (RMI), remote procedure call (RPC), etc.

Network 1006 may comprise various network devices, such as gateways, routers, switches, firewalls, servers, address translators, etc. Portions of network 1006 may be wired (e.g., using wired conductors, optical fibers, etc.) and/or wireless (e.g., using free-space optical (FSO), radio frequency (RF), acoustic transmission paths, etc.). Portions of network 1006 may include a substantially open public network, such as the Internet. Portions of network 1006 may include a more restricted network, such as a virtual private network (VPN). It should be noted that implementations of networks and/or devices operating on networks described herein are not limited with regards to information carried by the networks, protocols used in the networks, the architecture/configuration of the networks, etc. Examples of a network may include: an internet, such as the Internet; an intranet; a local area network (LAN); a wide area network (WAN); a metropolitan area network (MAN); a body area network (BAN); and a combination of networks, such as an internet and an intranet.

The service provider 1010 may include logic (e.g., software) that makes a service available to another device in the distributed environment 1000. The service provider 1010 may include a server operated by an entity (e.g., an individual, a corporation, an educational institution, a government agency, etc.) that provides one or more services to a destination, such as computer 1002. The services may include software containing computer-executable instructions that may be executed, in whole or in part, by a destination, by the service provider 1010 on behalf of the destination, or some combination thereof.

For example, in an embodiment, service provider 1010 may provide one or more subscription-based services that may be available to various customers. The services may be accessed by a customer via a network, such as network 1006. The customer may access the services using a computer, such as computer 1002. The service provider 1010 may limit access to certain services based on, for example, a customer service agreement between the customer and the service provider 1010. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used. Other arrangements may include basing fees on such factors as which symbolic engine is used and/or which symbolic command is used. Users may select which symbolic math engine to use based on the fee, or the quality of service of a symbolic math engine. In an embodiment, a service to solve a symbolic command may be auctioned. Prospective users of a symbolic math engine or command may obtain quotes for the estimated cost of using the symbolic math engine or command.

Cluster 1008 may include a number of units of execution (UEs) 1012 that may perform processing on behalf of computer 1002 and/or another device, such as service provider 1010. For example, in an embodiment, cluster 1008 may parallel process graphical models created by, for example, a customer. This parallel processing may include performing analysis on the models. The UEs 1012 may reside on a single device or chip or on multiple devices or chips. For example, the UEs 1012 may be implemented in a single application specific integrated circuit (ASIC) or in multiple ASICs. Likewise, the UEs 1012 may be implemented in a single computer system or multiple computer systems. Other examples of UEs 1012 include field programmable gate arrays (FPGAs), complex programmable logic devices (CPLDs), application specific instruction-set processors (ASIPs), microprocessors, etc.

The UEs 1012 may be configured to perform operations on behalf of another entity. For example, in an embodiment, the UEs 1012 are configured to execute portions of code associated with the TCE 104. Here, the TCE 104 may dispatch certain activities pertaining to parallel processing activities to the UEs 1012 for execution. In another embodiment, the service provider 1010 may configure cluster 1008 to provide interavailable model design capabilities to computer 1002 on a subscription basis (e.g., via a web service). For example, one interavailable design capability that may be provided in a subscription may include providing support to enable computer 1002 to perform model projections from one domain (environment) to another domain (environment).

Figure 11:
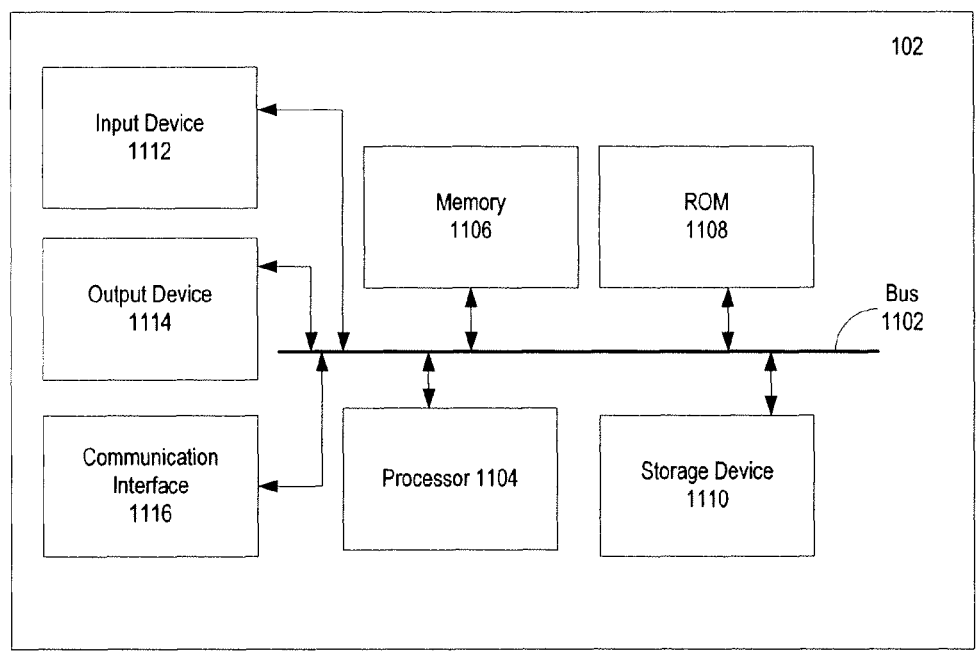
FIG. 11 depicts an example block diagram of a computer that may be configured to execute the TCE illustrated in FIG. 1.

FIG. 11 depicts an example block diagram of computer system 102. Referring to FIG. 11, computer system 102 may comprise one or more components that may include a bus 1102, a processor 1104, a memory 1106, a read only memory (ROM) 1108, a storage device 1110, an input device 1112, an output device 1114, and a communication interface 1116.

Bus 1110 may include one or more interconnects that permit communication among the components of computer system 102, such as processor 1104, memory 1106, ROM 1108, storage device 1110, input device 1112, output device 1114, and communication interface 1116.

Processor 1104 may include any type of processor, microprocessor, or processing logic that may interpret and execute instructions (e.g., a field programmable gate array (FPGA)). Processor 1104 may comprise a single device (e.g., a single core) and/or a group of devices (e.g., multi-core). The processor 1104 may include logic configured to execute computer-executable instructions configured to implement embodiments of the invention. The instructions may reside in the memory 1106 or ROM 1108, and may include instructions associated with the TCE 104.

The memory 1106 may be a computer-readable medium that may be configured to store instructions configured to implement one or more embodiments. The memory 1106 may be a primary storage accessible to the processor 1104 and may comprise a random-access memory (RAM) that may include RAM devices, such as Dynamic RAM (DRAM) devices, flash memory devices, Static RAM (SRAM) devices, etc.

Memory 1106 may be a computer-readable medium configured to implement a random access memory (RAM). Memory 1106 may store information (e.g., data) and instructions for processor 1104. The computer-executable instructions may include instructions executed by processor 1104.

ROM 1108 may include a non-volatile storage that may store information and computer-executable instructions for processor 1104. The computer-executable instructions may include instructions executed by processor 1104.

Storage device 1110 may be configured to store information that may include computer-executable instructions and data for processor 1104. Examples of storage device 1110 may include a magnetic disk, optical disk, flash drive, etc. The information may be stored on one or more computer-readable media contained in the storage device 1110. Examples of media may include a magnetic disk, optical disk, flash memory, etc. Storage device 1110 may include a single storage device or multiple storage devices. Moreover, storage device 1110 may attach directly to computer system 102 and/or may be remote with respect to computer system 102 and connected thereto via a network and/or another type of connection, such as a dedicated link or channel.

Input device 1112 may include any mechanism or combination of mechanisms that may permit information to be input into computer system 102 from, for example, a user. Input device 1112 may include logic configured to receive information for computer system 102 from, for example, a user. Examples of input device 1112 may include a keyboard, mouse, touch sensitive display device, microphone, pen-based pointing device, biometric input device, etc.

Output device 1114 may include any mechanism or combination of mechanisms that may output information from computer system 102, for example, from a user. Output device 1114 may include logic configured to output information from computer system 102. Embodiments of output device 1114 may include displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Communication interface 1116 may include logic configured to interface computer system 102 with network 1006 and enable computer system 102 to communicate with other entities connected to network 1006, such as, for example, service provider 1010, target environment 1004 and cluster 1008. Communication interface 1116 may include any transceiver-like mechanism that enables computer system 102 to communicate with the entities. The communications may occur over a communication medium, such as a data network. Communication interface 1116 may include one or more interfaces that are connected to the communication medium. The communication medium may be wired or wireless. Communication interface 1116 may be implemented as a built-in network adapter, network interface card (NIC), Personal Computer Memory Card International Association (PCM-CIA) network card, card bus network adapter, wireless network adapter, Universal Serial Bus (USB) network adapter, modem or any other device suitable for interfacing computer system 102 to any type of network.

Computer system 102 may perform certain functions in response to processor 1104 executing software instructions contained in a computer-readable medium, such as memory 1106. In alternative embodiments, hardwired circuitry may be used in place of or in combination with software instructions to implement features consistent with principles of the invention. Thus, implementations consistent with principles of the invention are not limited to any specific combination of hardware circuitry and software.

Embodiments may be embodied in many different ways as a software component. For example, an embodiment may be a stand-alone software package, or it may be a software package incorporated as a "tool" in a larger software product, such as, for example, a mathematical computational product, such as, for example, the Symbolic Math Toolbox of MATLAB® of The MathWorks, Inc. of Natick, Mass., USA. An embodiment may be downloadable from a network, for example, a website, as a stand-alone product or as an add-in package for installation in an existing software application. An embodiment may also be available as a client-server software application, or as a web-enabled software application.

Embodiments may exist as part of a technical computing environment, such as, for example, MATLAB® available from The MathWorks, Inc., Natick, Mass., USA. Embodiments may be embodied in one or more components associated with a TCE, such as, for example, in a function, a model, a class, etc. Embodiments may exist as part of a TCE that may be used with graphical models, such as, e.g. SIMULINK®, STATEFLOW®, SIMMECHANICS™ and SIMSCAPE™, of The MathWorks, Inc. of Natick, Mass., USA. Embodiments may be embodied in functional components of such a TCE, such as, for example, in a simulation block, or a simulation toolset. Embodiments may be part of the process to obtain an executable form of a model, for example, a SIMULINK model.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3, and 9-11 depending on specific deployments and/or applications. Further, disclosed implementations may not be limited to any specific combination of hardware.

Further, certain portions of the invention may be implemented as "logic," for example, as seen in FIG. 9, that performs one or more functions. This logic may include hardware, such as hardwired logic, an application-specific integrated circuit, a field programmable gate array, a microprocessor, software, wetware, or any combination of hardware, software, and wetware.

The foregoing description of embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4 and 7, the order of the acts may be modified in other implementations consistent with the principles of the invention. Further, non-dependent acts may be performed in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A computer-readable medium comprising computer-executable instructions that when executed on a processor select a symbolic math engine, the medium comprising:
one or more instructions for dynamically selecting a first symbolic math engine from two or more symbolic math engines;
one or more instructions for converting a first symbolic command from a standard format into a first format compatible with the first symbolic math engine;
one or more instructions for passing the first converted command to the first symbolic math engine for executing, the executing including producing a first result;
one or more instructions for outputting or storing the first result of the executing;
one or more instructions for converting a second symbolic command from the standard format into a second format compatible with a second symbolic math engine, wherein the first format and the second format are different;
one or more instructions for passing the second converted command to the second symbolic math engine;
one or more instructions for executing the second converted command using the second symbolic math engine; and
one or more instructions for producing a second result, the second result produced bused on executing the second converted command.

2. The computer-readable medium of claim 1, further comprising:
one or more instructions for dynamically selecting the second symbolic math engine.

3. The computer-readable medium of claim 2, wherein the first and second symbolic commands are the same symbolic command.

4. The computer-readable medium of claim 1, further comprising:
one or more instructions for converting the first result into the standard format.

5. The computer-readable medium of claim 1, wherein the one or more instructions for dynamically selecting further comprise:
one or more instructions for loading the first symbolic math engine.

6. The computer-readable medium of claim 1, further comprising:
one or more instructions for performing an operation in response to an error that occurs in the first symbolic math engine.

7. The computer-readable medium of claim 6, wherein the one or more instructions for performing an operation in response to an error further comprise:
one or more instructions for operating on an error common to a plurality of symbolic math engines by converting the error into an error compatible with the standard format.

8. A computer-implemented method for dynamic symbolic math engine selection, the method comprising:
running a technical computing environment (TCE) with an available first symbolic math engine on the computer with a processor;
selecting a second symbolic math engine dynamically from two or more symbolic math engines;
receiving a symbolic command in a standard format;
converting the symbolic command into a first format compatible with the first symbolic math engine; and
converting the symbolic command into a second format compatible with the second symbolic math engine, wherein the first format and the second format are different;
passing the second converted command to the second symbolic math engine for execution;
receiving a result from the second symbolic math engine, the result produced by the executing; and
outputting or storing the result.

9. The method of claim 8, wherein the first and second symbolic math engines are available in parallel to the TCE.

10. The method of claim 9, further comprising:
passing the first converted command to the first symbolic math engine and the second converted command to the second symbolic math engine in parallel.

11. The method of claim 9, further comprising:
receiving a second symbolic command in the standard format;
converting the second symbolic command into the first format compatible with the first symbolic math engine to obtain a third converted command;
passing the third converted command to the first symbolic math engine for execution;

receiving a result of execution of the third converted command from the first symbolic math engine; and outputting or storing the result of execution of the third converted command from the first symbolic math engine.

12. The method of claim 8, further comprising at least one of registering or discovering the second symbolic math engine.

13. The method of claim 8, wherein receiving the result of execution comprises:

receiving the result in the first format specific to the first symbolic math engine; and converting the result into the standard format.

14. The method of claim 8, wherein the TCE runs in a process, and further comprising running the selected second symbolic math engine in the same process as the TCE or in a different process.

15. The method of claim 8, further comprising at least one of:

running the selected second symbolic math engine on the same computer as the TCE; or running the selected second symbolic math engine on a different computer.

16. The method of claim 8, further comprising:

automatically selecting the second symbolic math engine by the TCE; or receiving a selection of the second symbolic math engine from a web service.

17. The method of claim 8, wherein receiving the symbolic command in the standard format includes receiving a reference to the symbolic command in the standard format.

18. The method of claim 17, wherein receiving the reference to the symbolic command in the standard format includes receiving an array of references to a plurality of symbolic commands in the standard format.

19. A method comprising:

downloading software to a computer system, which when executed by the computer system causes the computer system to perform operations comprising the method of claim 8; or providing downloadable software to the computer system, which when executed by the computer system causes the computer system to perform operations comprising the method of claim 8.

20. A computer-based system for symbolic math operation in a technical computing environment, comprising:

a memory; and a processor configured to:

select a first symbolic math engine dynamically from two or more available symbolic math engines;

receive a symbolic math command in a standard format;

convert the symbolic math command into a format compatible with the first symbolic math engine;

convert the symbolic math command into a second format compatible with a second symbolic math engine, wherein the first converted command and the second converted command are different;

pass the first converted command to the first symbolic math engine for execution;

receive a result of execution of the converted command from the first symbolic math engine; and output or store the result.

21. A computer-implemented method for dynamic symbolic math engine selection, the method comprising:

running a technical computing environment (TCE) with an available symbolic math engine in a first configuration;

dynamically changing the first configuration of the first symbolic math engine to a second configuration;

receiving a symbolic command in a standard format;

converting the symbolic command into a second format compatible with the second configuration of the symbolic math engine;

passing the converted command to the symbolic math engine for execution;

receiving a result from the symbolic math engine, the result produced by the executing; and outputting or storing the result.

22. The method of claim 21, wherein the symbolic math engine in the first configuration is available to the TCE in parallel with the symbolic math engine in the second configuration.

23. The method of claim 21, wherein the TCE is at least one of: a graphical programming environment, a graphical modeling environment, a physics modeling environment, or an ordinary differential equations/differential algebraic equations (ODE/DAE) environment.

* * * * *